(12) United States Patent
Leibssle et al.

(10) Patent No.: US 11,808,369 B2
(45) Date of Patent: Nov. 7, 2023

(54) PRESSURE-CONTROLLED SHUT-OFF VALVE FOR A FUEL CELL SYSTEM, AND FUEL CELL SYSTEM

(71) Applicant: Robert Bosch GmbH, Stuttgart (DE)

(72) Inventors: Benedikt Leibssle, Stuttgart (DE); Dirk Schnittger, Ludwigsburg (DE); Friedrich Howey, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/796,246

(22) PCT Filed: Dec. 4, 2020

(86) PCT No.: PCT/EP2020/084604
§ 371 (c)(1),
(2) Date: Jul. 28, 2022

(87) PCT Pub. No.: WO2021/151563
PCT Pub. Date: Aug. 5, 2021

(65) Prior Publication Data
US 2023/0079767 A1    Mar. 16, 2023

(30) Foreign Application Priority Data
Jan. 31, 2020 (DE) .............. 10 2020 201 173.7

(51) Int. Cl.
*F16K 17/04*      (2006.01)
*H01M 8/04089*    (2016.01)
*H01M 8/04082*    (2016.01)

(52) U.S. Cl.
CPC ......... *F16K 17/04* (2013.01); *H01M 8/04089* (2013.01); *H01M 8/04201* (2013.01)

(58) Field of Classification Search
CPC ...... F16K 17/04; F16K 17/065; F16K 31/124; G05D 16/10; H01M 8/04089; H01M 8/04201
See application file for complete search history.

(56) References Cited

U.S. PATENT DOCUMENTS 4,237,926 A * 12/1980 Walker ............... F16K 21/04
                                                  417/295
9,328,745 B2 * 5/2016 Bartlok .................. F17C 5/06
(Continued)

FOREIGN PATENT DOCUMENTS

| DE | 102011109424 A1 | 2/2013 | |
| EP | 1555468 A1 | 7/2005 | |
| EP | 2489909 A1 * | 8/2012 | ............. F16K 17/04 |

OTHER PUBLICATIONS

Translation of International Search Report for Application No. PCT/EP2020/084604 dated Mar. 15, 2021 (2 pages).

*Primary Examiner* — Jessica Cahill
(74) *Attorney, Agent, or Firm* — Michael Best & Friedrich LLP

(57) ABSTRACT

The invention relates to a pressure-controlled shut-off valve (1) for temporarily interrupting the air supply to a fuel cell stack in a fuel cell system, comprising a valve piston (3) which can be moved back and forth in a cylindrical housing bore (2) and which is biased in the direction of a seal seat (5) by the spring force of a spring (4), wherein a connection between an air inlet channel (6) and an air outlet channel (7) is produced or interrupted depending on the axial position of the valve piston (3). According to the invention, the valve piston (3) delimits a spring chamber (8), which receives the spring (4) and to which ambient pressure is applied, on one side and a control chamber (9), which is connected to the air inlet channel (7), on the other side within the housing bore (Continued)

(2). The invention additionally relates to a fuel cell system comprising a shut-off valve (1) according to the invention.

18 Claims, 1 Drawing Sheet

(56) References Cited

U.S. PATENT DOCUMENTS

| | | | |
|---|---|---|---|
| 10,562,165 B2* | 2/2020 | Moore | F16K 17/04 |
| 2005/0221147 A1* | 10/2005 | Shioya | F16K 31/1266 |
| | | | 429/513 |
| 2007/0178351 A1* | 8/2007 | Saito | H01M 8/04208 |
| | | | 429/513 |
| 2008/0196773 A1* | 8/2008 | Franconi | F16K 31/124 |
| | | | 137/488 |
| 2015/0308222 A1* | 10/2015 | Hall | F16K 17/30 |
| | | | 137/538 |
| 2018/0245489 A1 | 8/2018 | Thomas et al. | |

\* cited by examiner

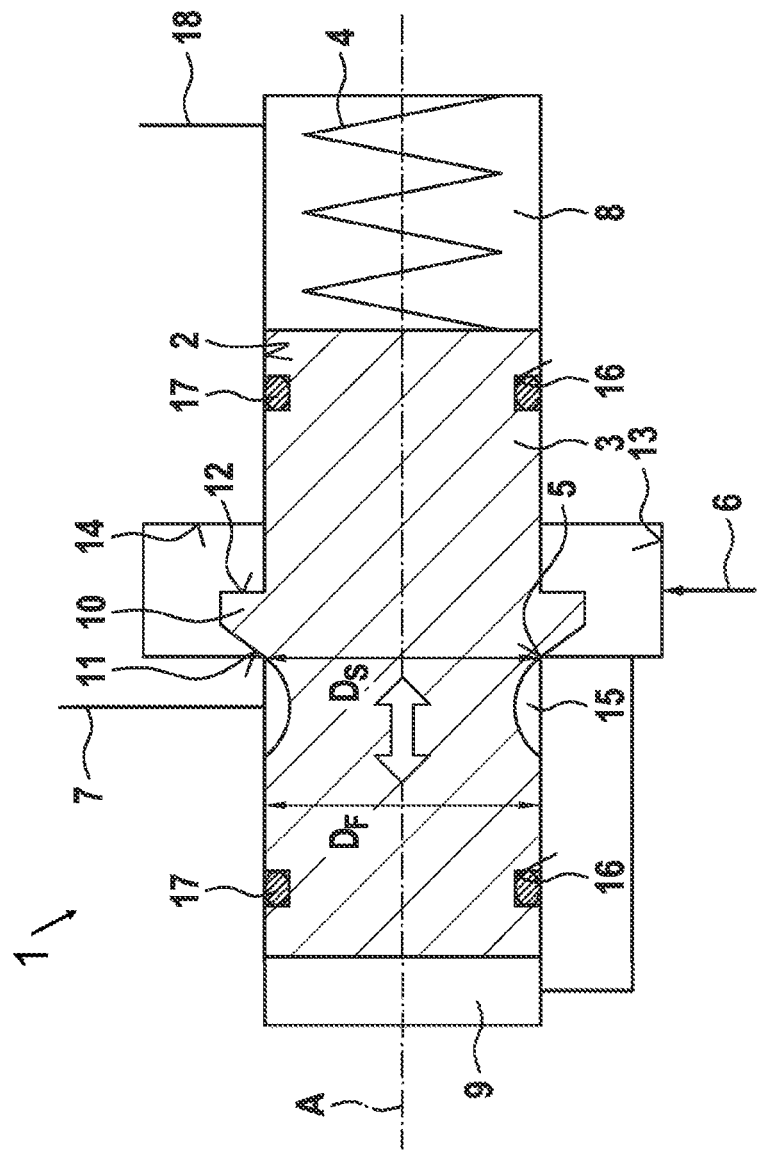

PRESSURE-CONTROLLED SHUT-OFF VALVE FOR A FUEL CELL SYSTEM, AND FUEL CELL SYSTEM

BACKGROUND OF THE INVENTION

The invention relates to a pressure-controlled shut-off valve for temporarily interrupting the air supply to a fuel cell stack in a fuel cell system, the shut-off valve comprising a valve piston which can be moved back and forth in a cylindrical housing bore and which is biased in the direction of a seal seat by the spring force of a spring, wherein a connection between an air inlet channel and an air outlet channel is produced or interrupted depending on the axial position of the valve piston. The invention further relates to a fuel cell system comprising such a pressure-controlled shut-off valve.

In a fuel cell system, valves which interrupt the connection between a fuel cell stack and an air supply are required when the system is at a standstill. As a result, air or oxygen is also to be prevented from passing to the cathode side of a membrane which is arranged between a cathode and an anode. This is because this oxygen diffuses through the membrane from the cathode side to the anode side and thus when the system is started up again it leads to an "air-to-air start" which is damaging for the fuel cell system.

The interruption of the air supply may be brought about by means of so-called shut-off valves. These shut-off valves are generally actively controlled in order to interrupt the air supply. To this end, an actuator which needs additional installation space and involves further costs is required. The use of a passive valve, for example in the form of a simple check valve, which is controlled solely by the applied pressure or the prevailing flow conditions is also possible in principle. The design of a spring acting in the closing direction, however, proves difficult since the spring force, on the one hand, has to be sufficiently great in order to hold the check valve securely closed and, on the other hand, should not be too great so as not to delay the opening of the valve when the system is started up again. This is because after an interruption to the air supply, a 100% air flow should be achieved again as rapidly as possible in order to avoid temporary local differences in the fuel cells, which may lead to damage to the system. Moreover, a conventional check valve is able to be used in only one flow direction and is associated with an increased pressure loss.

SUMMARY OF THE INVENTION

It is the object of the present invention accordingly to specify a valve for interrupting the air supply to a fuel cell stack in a fuel cell system, which results in the aforementioned drawbacks being remedied. In order to achieve the object, the shut-off valve of the invention is proposed. Advantageous developments of the invention may be derived from the subclaims. Moreover, a fuel cell system comprising such a shut-off valve is specified.

A pressure-controlled shut-off valve for temporarily interrupting the air supply to a fuel cell stack in a fuel cell system is proposed. The pressure-controlled shut-off valve comprises a valve piston which can be moved back and forth in a cylindrical housing bore and which is biased in the direction of a seal seat by the spring force of a spring. A connection between an air inlet channel and an air outlet channel is produced or interrupted depending on the axial position of the valve piston. According to the invention, the valve piston delimits on one side a spring chamber which receives the spring and to which ambient pressure is applied, and on the other side a control chamber which is connected to the air inlet channel within the housing bore.

By using a pressure-controlled, i.e. passive, shut-off valve, installation space and costs may be saved. The air flow to be switched is used as control energy, said air flow at the same time transmitting information. An electrical actuator with an electrical connection may accordingly be dispensed with.

In the case of shut-down, the control chamber of the shut-off valve is no longer subjected to a supply pressure which is higher than ambient pressure but only to ambient pressure. Since ambient pressure also prevails at the other end on the valve piston, this valve piston is virtually equalized in terms of pressure. Via the spring force of the spring bearing against the other end, the valve piston is accordingly positioned in the seal seat such that the connection between the air inlet channel and the air outlet channel is interrupted. If the fuel cell system is then started up again, the control chamber of the shut-off valve is again subjected to supply pressure. This brings about a pneumatic compressive force which is greater than the forces acting on the valve piston at the other end, such that the valve piston is lifted out of the seal seat.

In contrast to a simple check valve, the proposed shut-off valve acts in both flow directions. In other words, in the closed position air passes neither from the air inlet channel into the air outlet channel, nor from the air outlet channel into the air inlet channel.

In a development of the invention, it is proposed that the seal seat has a seat diameter which substantially corresponds to a guide diameter of the valve piston. This measure contributes to the fact that the opening characteristic of the shut-off valve is not negatively affected or at least not to a significant degree. This is because when the shut-off valve is closed, it may lead to a negative pressure in the region of the air outlet channel, which exerts an additional closing force on the valve piston. This effect, however, is minimal if the diameters are at least approximately equal.

Further preferably, the valve piston has an annular groove on the external peripheral side for connecting the air inlet channel to the air outlet channel. The annular groove permits a seat diameter of the seal seat which corresponds to the guide diameter of the valve piston. If a negative pressure is produced in the region of the air outlet channel when the shut-off valve is closed, this negative pressure also prevails in the annular groove. The opening characteristic of the shut-off valve, however, is barely negatively affected thereby.

According to a preferred embodiment of the invention, the valve piston has an annular collar for forming a sealing surface cooperating with the seal seat. The annular collar also contributes to the fact that the seat diameter of the seal seat is able to correspond substantially to the guide diameter of the valve piston. In order to increase the sealing action in the seal seat, for example, the sealing surface on the annular collar may be conically or spherically shaped. With a spherical shaping, the outer contour may be curved in a concave or convex manner. In all of these cases, it leads to a linear, annular sealing contact when the valve piston is positioned in the seal seat. The annular collar forming the sealing surface preferably directly adjoins the annular groove of the valve piston.

Moreover, it is proposed that the annular collar on the side remote from the sealing surface forms a stop surface which cooperates with a stroke stop on the housing side. Whilst a first end position of the valve piston is predetermined via the sealing surface configured on the annular collar, in combination with the seal seat on the housing side, the stop surface which is also configured on the annular collar delimits a second end position in combination with the stroke stop. The valve piston thus moves back and forth between two end positions. In other words, the stroke of the valve piston is delimited.

Further preferably, the housing bore receiving the valve piston has a widening in the form of an annular groove for receiving the annular collar of the valve piston and/or for forming the stroke stop. The annular groove permits a cylindrical housing bore which—except for in the region of the annular groove—has consistently the same internal diameter for guiding the valve piston. The stroke stop, optionally also configured by the annular groove, preferably cooperates with the stop surface which is configured on the annular collar of the valve piston, if such a stop surface is provided.

Advantageously, the valve piston has at least one annular groove on the external peripheral side, a sealing ring being received therein. A seal of the control chamber and/or the spring chamber inside the cylindrical housing bore is or are effected via the at least one sealing ring. Preferably, therefore, the valve piston has in each case in the region of its two ends an annular groove with a sealing ring received therein. In this manner, a seal of both the control chamber and of the spring chamber is achieved.

Alternatively, it is proposed that the housing bore has at least one widening annular groove, a sealing ring being received therein. In this manner, a seal may also be achieved.

The fuel cell system which is also proposed is characterized in that it comprises a shut-off valve according to the invention for temporarily interrupting the air supply to a fuel cell stack.

The shut-off valve ensures that, when the system is shut down, air and thus also oxygen no longer pass to the cathode side of the fuel cell stack.

BRIEF DESCRIPTION OF THE DRAWINGS

A preferred embodiment of the invention is described in more detail hereinafter with reference to the accompanying drawing.

The single drawing FIGURE shows a schematic longitudinal section through a shut-off valve according to the invention.

DETAILED DESCRIPTION

The pressure-controlled shut-off valve 1 shown in FIG. 1 for a fuel cell system comprises a valve piston 3 which is received so as to be movable back and forth in a cylindrical housing bore 2 and which inside the housing bore 2 delimits a spring chamber 8 in which a spring 4 is received. Via the spring force of the spring 4, the valve piston 3 is biased in the axial direction, i.e. in the direction of a longitudinal axis A, against a seal seat 5 on the housing side. The spring chamber 8 is connected to the surroundings via a channel 18 such that ambient pressure prevails in the spring chamber 8. On the side remote from the spring chamber 8, inside the housing bore 2 the valve piston 3 delimits a control chamber 9 which is connected to an air inlet channel 6, such that the same pressure, i.e. supply pressure, prevails in the control chamber 9 as in the air inlet channel 6. This is higher than ambient pressure and accordingly brings about an opening force which holds the valve piston 3 counter to the spring force of the spring 4 in an open position. In this position, a connection between the air inlet channel 6 and an air outlet channel 7 is produced such that air is supplied to the fuel cell stack (not shown) of the fuel cell system.

If the fuel cell system is shut down, the pressure drops in the control chamber 9 to ambient pressure. Thus the same pressure prevails in the control chamber 9 as in the spring chamber 8 and the valve piston 3 is virtually equalized in terms of pressure. The spring force of the spring 4 is now able to position the valve piston 3 in the seal seat 5. In this case, a sealing surface 11 configured on an annular collar 10 of the valve piston 3 comes to bear against the seal seat 5. Since the sealing surface 11 is conically shaped, the sealing contact is linear or annular. In this position, the closed position, the connection between the air inlet channel 6 and the air outlet channel 7 is interrupted. In other words, no more air is supplied to the fuel cell stack of the fuel cell system.

In the closed position in the region of the air outlet channel 7, it may lead to a negative pressure which brings about a further closing force on the valve piston 3, such that the opening characteristic of the shut-off valve 1 is negatively affected. In order to counteract this, the seat diameter $D_S$ is selected to be substantially equal to the guide diameter $D_F$ of the valve piston 3. Moreover, in the valve piston 3 an annular groove 13 is configured on the external peripheral side adjoining the annular collar 10, in the open position of the shut-off valve 1 a connection between the air inlet channel 6 and the air outlet channel 7 being able to be produced thereby.

On the side remote from the sealing surface 11, the annular collar 10 of the valve piston 3 forms a stop surface 12 which cooperates with a stroke stop 14 on the housing side. The stroke stop 14 is configured by an annular groove 15 widening the housing bore 2, the annular collar 10 of the valve piston 3 being received in said annular groove. As a result, it is ensured that the valve piston 3 may move back and forth in spite of the annular collar 10, wherein the seal seat 5, on the one hand, and the stroke stop 14, on the other hand, delimit the respective end positions of the valve piston 3.

The valve piston 3 shown in the FIGURE has two further annular grooves 16 in which a sealing ring 17 is received in each case. The control chamber 9 and the spring chamber 9 are sealed relative to the housing bore 2 via the sealing rings 17.

What is claimed is:

1. A pressure-controlled shut-off valve (1) for temporarily interrupting the air supply to a fuel cell stack in a fuel cell system, the shut-off valve comprising a valve piston (3) which can be moved back and forth in a cylindrical housing bore (2) and which is biased in a direction of a seal seat (5) by a spring force of a spring (4), wherein a connection between an air inlet channel (6) and an air outlet channel (7) is produced or interrupted depending on an axial position of the valve piston (3), characterized in that the valve piston (3) delimits on one side a spring chamber (8) which receives the spring (4) and to which ambient pressure is applied, and on an other side a control chamber (9) which is connected to the air inlet channel (6) within the housing bore (2), and, wherein the valve piston (3) has an annular collar (10) with a lamer diameter than a seat diameter (Ds) of the seal seat (5).

2. The shut-off valve (1) as claimed in claim 1, characterized in that the seat diameter ($D_S$) substantially corresponds to a guide diameter ($D_F$) of the valve piston (3).

3. The shut-off valve (1) as claimed in claim 1, characterized in that the valve piston (3) has an annular groove (15)

on an external peripheral side for connecting the air inlet channel (6) to the air outlet channel (7).

4. The shut-off valve (1) as claimed in claim 3, characterized in that the annular collar (10) forms a sealing surface (11) cooperating with the seal seat (5), wherein the annular collar (10) directly adjoins the annular groove (15).

5. The shut-off valve (1) as claimed in claim 1, characterized in that the valve piston (3) has an annular collar (10) forms a sealing surface (11) cooperating with the seal seat (5).

6. The shut-off valve (1) as claimed in claim 5, characterized in that the annular collar (10) on a side remote from the sealing surface (11) forms a stop surface (12) which cooperates with a stroke stop (14) on a housing side.

7. The shut-off valve (1) as claimed in claim 6, characterized in that the housing bore (2) has a widening in the form of an annular groove (13) for receiving the annular collar (10) of the valve piston (3) and/or for forming the stroke stop (14).

8. The shut-off valve (1) as claimed in claim 1, characterized in that the valve piston (3) has at least one annular groove (16) on an external peripheral side, a sealing ring (17) being received therein.

9. The shut-off valve (1) as claimed in claim 1, characterized in that the housing bore (2) has at least one widening annular groove, a sealing ring (17) being received therein.

10. A fuel cell system comprising a shut-off valve (1) as claimed in claim 1 for temporarily interrupting the air supply to a fuel cell stack.

11. A pressure-controlled shut-off valve (1) for temporarily interrupting the air supply to a fuel cell stack in a fuel cell system, the shut-off valve comprising a valve piston (3) which can be moved back and forth in a cylindrical housing bore (2) and which is biased in a direction of a seal seat (5) by a spring force of a spring (4), wherein a connection between an air inlet channel (6) and an air outlet channel (7) is produced or interrupted depending on an axial position of the valve piston (3), characterized in that the valve piston (3) delimits on one side a spring chamber (8) which receives the spring (4) and to which ambient pressure is applied, and on an other side a control chamber (9) which is connected to the air inlet channel (6) within the housing bore (2), wherein the valve piston (3) has an annular collar (10) for forming a sealing surface (11) cooperating with the seal seat (5), and wherein the annular collar (10) on a side remote from the sealing surface (11) forms a stop surface (12) which cooperates with a stroke stop (14) on a housing side.

12. The shut-off valve (1) as claimed in claim 11, characterized in that the seal seat (5) has a seat diameter ($D_S$) which substantially corresponds to a guide diameter ($D_F$) of the valve piston (3).

13. The shut-off valve (1) as claimed in claim 11, characterized in that the valve piston (3) has an annular groove (15) on an external peripheral side for connecting the air inlet channel (6) to the air outlet channel (7).

14. The shut-off valve (1) as claimed in claim 13, characterized in that the annular collar (10) directly adjoins the annular groove (15).

15. The shut-off valve (1) as claimed in claim 11, characterized in that the housing bore (2) has a widening in the form of an annular groove (13) for receiving the annular collar (10) of the valve piston (3) and/or for forming the stroke stop (14).

16. The shut-off valve (1) as claimed in claim 11, characterized in that the valve piston (3) has at least one annular groove (16) on an external peripheral side, a sealing ring (17) being received therein.

17. The shut-off valve (1) as claimed in claim 11, characterized in that the housing bore (2) has at least one widening annular groove, a sealing ring (17) being received therein.

18. A fuel cell system comprising a shut-off valve (1) as claimed in claim 11 for temporarily interrupting the air supply to a fuel cell stack.

\* \* \* \* \*